United States Patent [19]

Savor

[11] 4,262,187
[45] Apr. 14, 1981

[54] SYSTEM FOR PLUGGING TUBES BY WELDING

[75] Inventor: Dennis E. Savor, Hixson, Tenn.

[73] Assignee: Combustion Engineering, Inc., Windsor, Conn.

[21] Appl. No.: 936,432

[22] Filed: Aug. 24, 1978

[51] Int. Cl.² ............................................. B23K 9/00
[52] U.S. Cl. ............................ 219/125.11; 219/60.2; 219/136
[58] Field of Search ............ 219/125.1, 125.11, 60 A, 219/137 R, 60.2, 136, 158, 160

[56] References Cited

U.S. PATENT DOCUMENTS

| | | | |
|---|---|---|---|
| 2,930,883 | 3/1960 | Adamel | 219/125.11 X |
| 3,188,446 | 6/1965 | Ray | 219/137 R |
| 3,621,182 | 11/1971 | Peyrot | 219/60 A |
| 3,643,059 | 2/1972 | Hill | 219/60.2 |
| 4,103,140 | 7/1978 | Glatthorn | 219/60 A |

Primary Examiner—E. A. Goldberg
Attorney, Agent, or Firm—Arthur L. Wade

[57] ABSTRACT

Semi-automatic welding apparatus is suspended from a plug body vertically force fitted into the end of a tube to which the plug is welded. The plug body configuration is disclosed, along with the internal arrangement it provides for suspending the welding apparatus. A mandrel is depicted in its movable parts which enables it to be manually linked between the plug body and welding apparatus.

7 Claims, 5 Drawing Figures

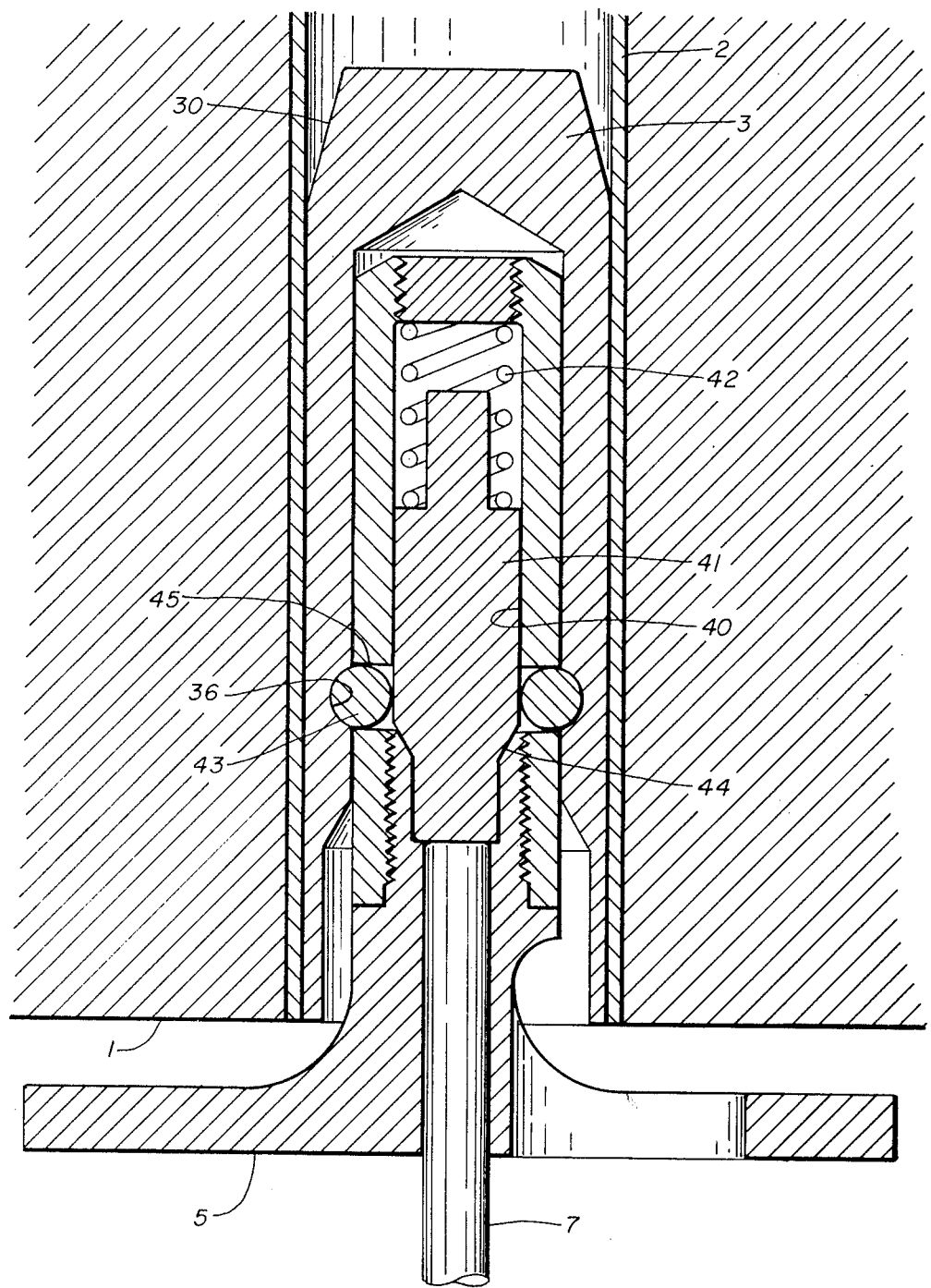

SYSTEM FOR PLUGGING TUBES BY WELDING

BACKGROUND OF THE INVENTION

1. Scope of the Invention

The present invention relates to the suspension of welding apparatus from plug bodies welded in the end of tubes extended down through horizontal tube sheets. More specifically, the invention relates to linking a plug body, force fitted up into the end of a tube, with welding apparatus by a manually engageable, and disengagable, mandrel permanently mounted on the welding apparatus and insertable into the plug body.

2. Prior Art

All parts and pieces of nuclear power plants are continually inspected during fabrication and service. Elaborate inspection techniques ferret out tubes of the heat exchangers of nuclear steam generators which have failed, or are near failure. A deliberate plan is to provide a pre-determined excess of tubes for the heat exchanger. Then, if inspection decrees it prudent to remove a tube from service, sufficient tubes remain to carry on. Of course, eventually, the number of tubes plugged, removed from service, eventually force a shut down for a massive overhaul of the system. But it is practical to seal off a large number of tubes in these heat exchangers and continue their function without crippling the overall system.

The present problem assumes the inspection technique and apparatus have designated one or more tubes to be removed from service. Further, the assumption is simply that a plug body of metallic material can be jammed up into the end of the designated tube and its periphery welded to the mouth of the tube to effectively bring about their union.

Unfortunately, for this simple plan, these heat exchangers are "hot." The heat exchanger is part of the cycle containing radioactive material. Although the heat exchanger is drained of its fluids in anticipation of the tube blocking operation, a radiation level remains which must be accounted for in employing personnel for the plugging operation. The tube plugger is required to jump into the heat exchanger, locate the offending tube, and hammer a plug body into its open end, weld the body into place within a prescribed program of man-rem hours. Therefore, the less time a welder spends in the heat exchanger, the better.

Although hammering a tube body up into the end of a designated tube and welding it in place with a handheld welding gun is not complex by objective standards, its demand for manual dexterity under the stress of the radiation threat has created problems. Plug bodies have been misaligned in hammering them into their force fit position and the guiding mandrels of welding guns have been bent and broken in forming the welds between tube and plug. The technology is demanding another step forward in the art to raise the quality of the plugging operation.

SUMMARY OF THE INVENTION

The present invention provides a bullet-shaped plug, which is externally sized to be forced upwardly into a tube, the internal wall of the plug having a circular race formed horizontally within the walls to receive spherical locking elements moved into the race from an elongated mandrel positioned up inside the bore of the plug with welding apparatus suspended from the mandrel. The welding gun attached to the mandrel is thus fixed to the lower end of the mandrel and the gun and mandrel rotate while locked to the groove within the plugs to bring the electrode of the gun into uniform contact with the edges of the plug, the tube into which the plug is thrust, and the tube sheet surface adjacent the tube edges.

Other objects, advantages and features of the invention will become apparent to one skilled in the art upon consideration of the written specification, appended claims and accompanying drawings.

BRIEF DESCRIPTION OF THE PREFERRED EMBODIMENT

General Arrangement and Operation

Figure 1:
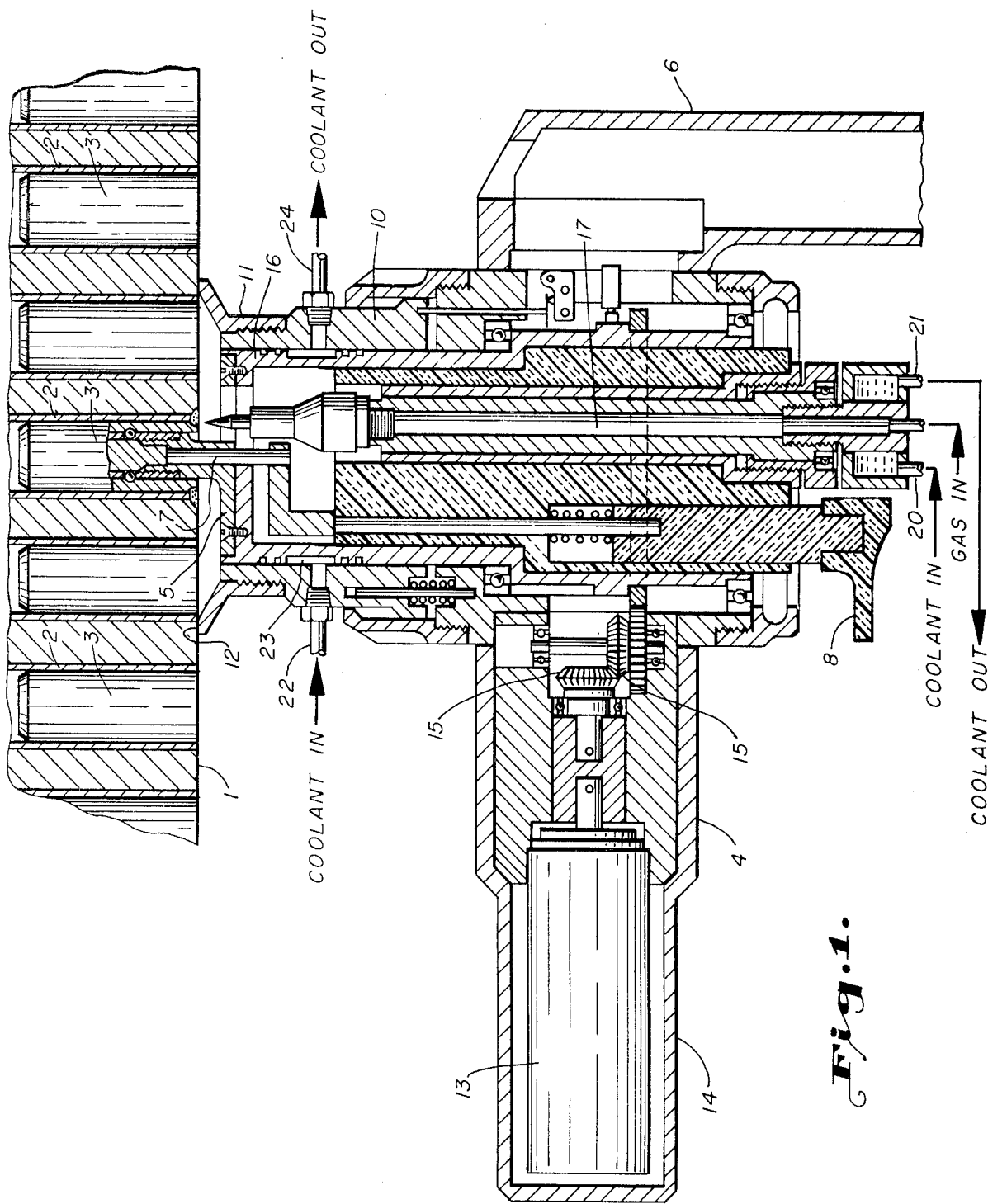
FIG. 1 is a sectioned elevation of a horizontal, downwardly facing, tube sheet of a heat exchanger with the plug for one of the tubes in position to be welded into place with welding apparatus, suspended from the plug and embodying the present invention.

Actually, FIG. 1 provides a fairly complete disclosure of the broader concepts of the invention. Only a fragment of the tube sheet 1 is shown as having the plurality of tubes 2 thrust downwardly through the tube sheet in make up of a heat exchanger which is a part of the steam generator of a nuclear reactor. The assumption is that one of the tubes 2 has been inspected and found to be defective. The heat exchanger has been built with an excess of heat exchange tubes, so that upon failure, a significant number of the excess tubes may be plugged, as they become defective, without taking the heat exchanger out of service. At least the heat exchanger is not taken out of service between major shut-downs for more extensive repair and servicing.

The tube 2, designated as defective by inspection, is taken out of service by welding a plug 3 into the open end of the tube, which extends through the tube sheet 1. In principal, this method of removing tubes from service is quite simple. In practice, the welding operation is carried out in an extremely awkward location.

First, the inside of the heat exchanger is radioactive to some extent. Therefore, the time available to personnel to make repairs is limited by the number of man-rem hours which is safe. Obviously, it behooves the welder to get in and out of this area as quickly as possible. This haste makes waste in the form of broken equipment and poorly executed welds. The present invention provides a system wherein a plug can be accurately force fit into a tube and welding apparatus can be suspended from inside the plug and directed into automatically welding between the lower edge of the plug, the tube in which the plug is force fit, and the tube sheet through which the tube is thrust. Thus, manual operation is reduced to the level where quality does not depend upon unskilled labor.

More specifically, welding gun 4 is linked to the inside wall of plug 3 with a mandrel 5. Thus, we have the apparatus to carry out the welding operation on the plug, tube and sheet clinging like a bat to the underside of the tube sheet. From this position, the welding apparatus can execute its union of the plug to the tube sheet uniformly as the apparatus is rotated from its perch inside plug 3.

The overall operation is quite simple. A workman with little skill can hurry into the area below the tube sheet and accurately drive the novel form of plug 3 into position. Force fit into position, the plug can support hundreds of pounds of weight. The workman can then thrust mandrel 5 up into the plug, trip linking mechanism of the mandrel, to couple the mandrel and plug in a manner which will provide rotational movement of the mandrel. Essentially, the worker needs only then to punch a button to start the welding apparatus and depart the dangerous area, while the weld is completed. Returning, the workman can unlatch the mandrel with a push of a button, hammer another plug into place and repeat the welding operation. The result is a reduction in man-rem hours over previous accumulations involving hand-held welding equipment. The second result is uniform, dependable welds between the plugs, tubes and sheets.

SUSPENSION OF WELDING GUN 4

Heretofore, the disclosure has described the welding gun as clinging to the internal wall of the tube plug 3. The gun 4 can be inspected in its FIG. 1 position. The gun is placed in this position manually by a grasp on handle 6. The gun is placed in the position shown, mandrel 5 extending up into plug 3. Push rod 7 is moved upward as viewed in FIG. 1, to keep the side wall of the tube plug and the mandrel is disengaged. Push rod 7 is, in effect, linked to be manually actuated by latch mechanism 8. The operator actuates latch 8 to move push rod 7 upward, inserting a mandrel into the tube plug, and then allowing a spring to force rod 7 downward, so the locking elements between the mandrel and tube plug will engage. The operaton to carry out this function of the apparatus is readily discerned from inspection of FIG. 1.

The sequence is for the operator to insert the mandrel of the gun up into the tube plug and operate the mechanism to latch the mandrel to the inside wall of the plug. The welding gun attached to the mandrel is then actuated to weld the tube plug into place.

ROTATION OF THE WELDING ELECTRODE ON GUN 4

Gun 4 has an outer casing 10, which is effectively linked to the underside of tube sheet 1. A cup structure 11 is mounted on the top of casing 10, so the cup lips 12 will positively engage the surface of the tube sheet 1 as gun 4 has its mandrel inserted up into the tube plug. This positive engagement and latch of the entire gun to the tube plug by the mandrel, links the welding gun casing and the tube sheet together, through the cup 11.

Mounted on the casing 10 is a motor 13, which is enclosed in its own sub housing 14. Therefore, motor 13 is fixed in relation to casing 10. Gears 15 connect the motor 13 to barrel 16, which is rotatable within casing 10 of the gun. It is on this barrel 16 that the welding electrode is mounted, so it will follow the edge of the tube plug and tube and the hole of the sheet to weld them together.

Barrel 16 is essentially a cylindrical housing. The barrel rotates with its longitudinal axis aligned with the axis of the mandrel. Welding electrode 17 is offset from the axis the radial distance which will cause it to engage the surface to be welded. Therefore, with the gun firmly planted on the underside of the tube sheet 1, motor 13 is actuated to rotate barrel 16, so the welding electrode 17, mounted on the barrel, will be automatically carried over the surfaces to be welded together.

Cup 11 has at least two functions. As described, it forms a link between the tube sheet and the outer gun casing 10, so that the casing will be fixed in relation to the tube sheet while the barrel 16 is rotated by motor 13. Secondly, the cup forms a retention chamber about the electrode and welded surfaces to maintain the welding process isolated. The present welding system utilized is the so-called TIG process. Essentially, the electrode of this system has an electric arc generated between it and the surfaces to be welded within an inert gas atmosphere. Cup 11 forms an effective isolation chamber in which this welding process can be carried out.

THE COOLING SYSTEM

The welding operation with gun 4 generates a large quantity of heat. It is necessary that this heat be removed from the welding gun structure. Essential elements of this cooling system are to be traced from the inlet coolant conduit 20 which directs coolant to the base of the electrode. The coolant is then conducted by way of outlet conduit 21, and is connected up to coolant inlet 22 for circulation of the coolant with cavity 23 of the barrel 16. The majority of the heat generated by the welding electrode is located in heat exchange contact with this cavity, and the coolant therein absorbs the heat. The coolant is then conducted from this cavity by outlet 24. The pump for the coolant, and the means for dissipating the heat of the coolant, are not shown. The disclosure is essentially directed to the cooling problem of flowing the coolant to those specific areas of the gun 4, which require heat to be withdrawn, in order for operation of the gun to be carried on continuously.

SUB-CONCLUSION

The operation of the various elements and systems associated with the gun 4 have been outlined in their structure and cooperation disclosed in FIG. 1.

Figure 2:
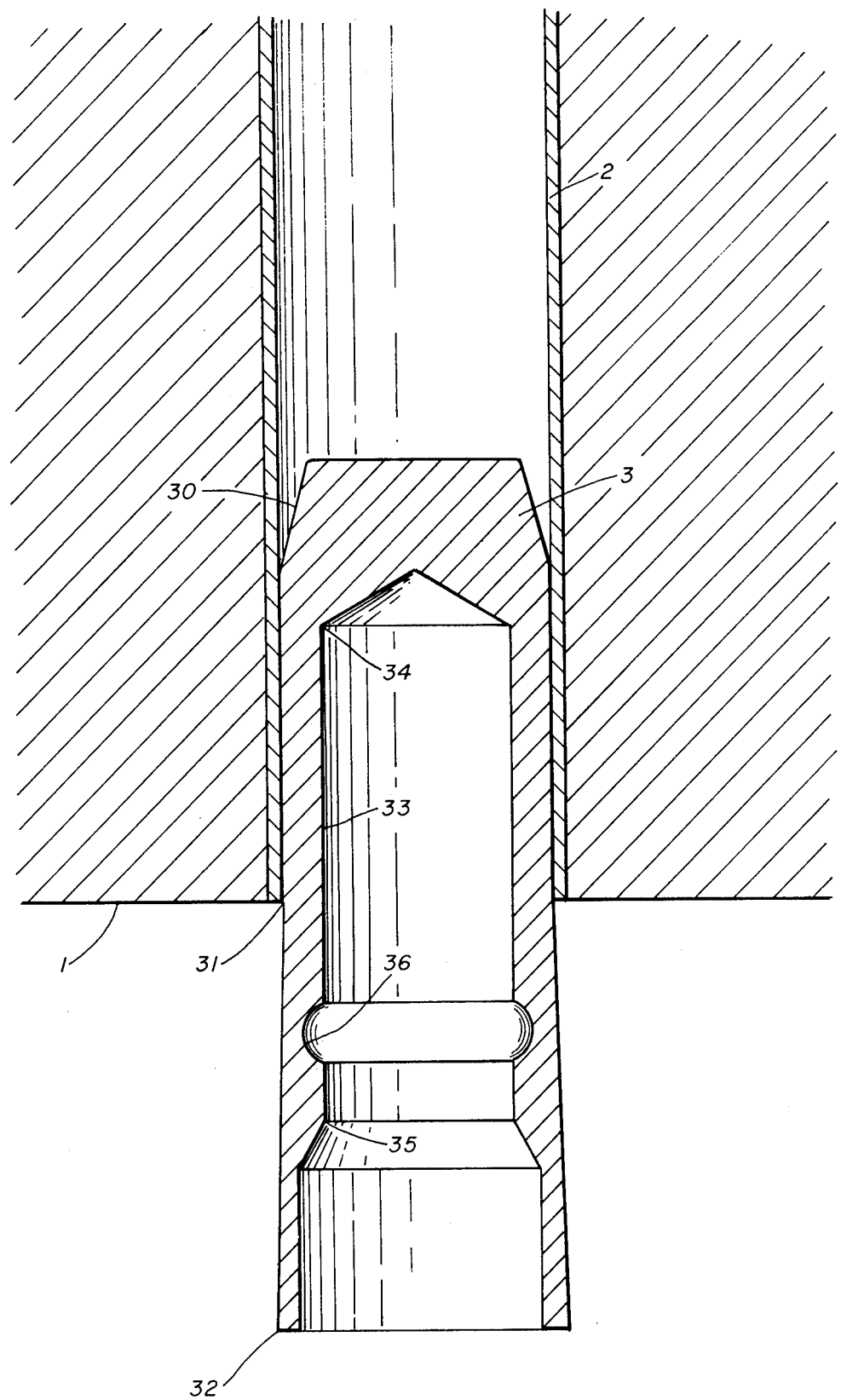
FIG. 2 is a sectioned elevation of the plug of FIG. 1 as it is being inserted in the tube to which it is to be welded.
Figure 3:
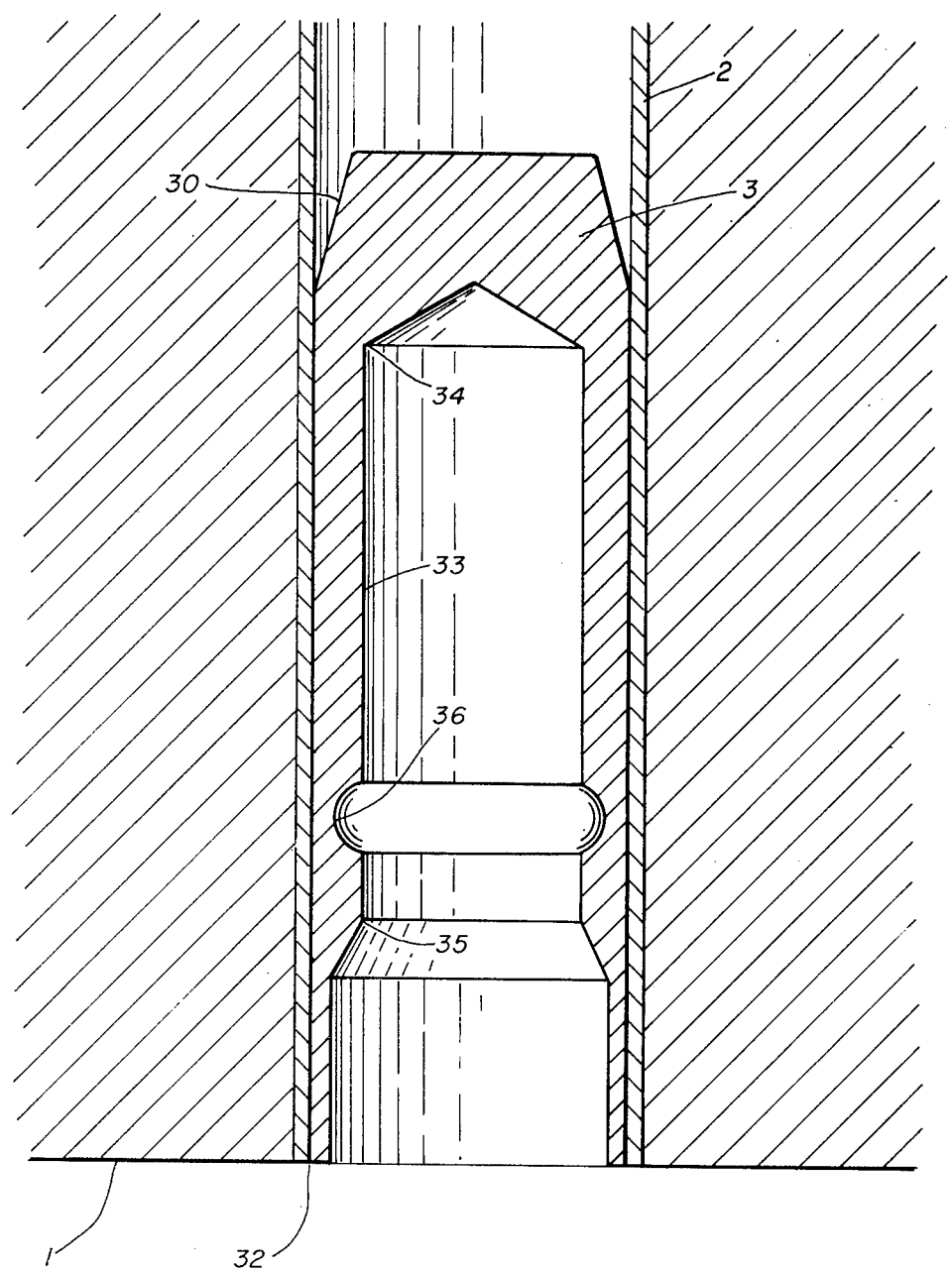
FIG. 3 is the plug of FIG. 2 after it has been force fitted into position for welding.
Figure 4:
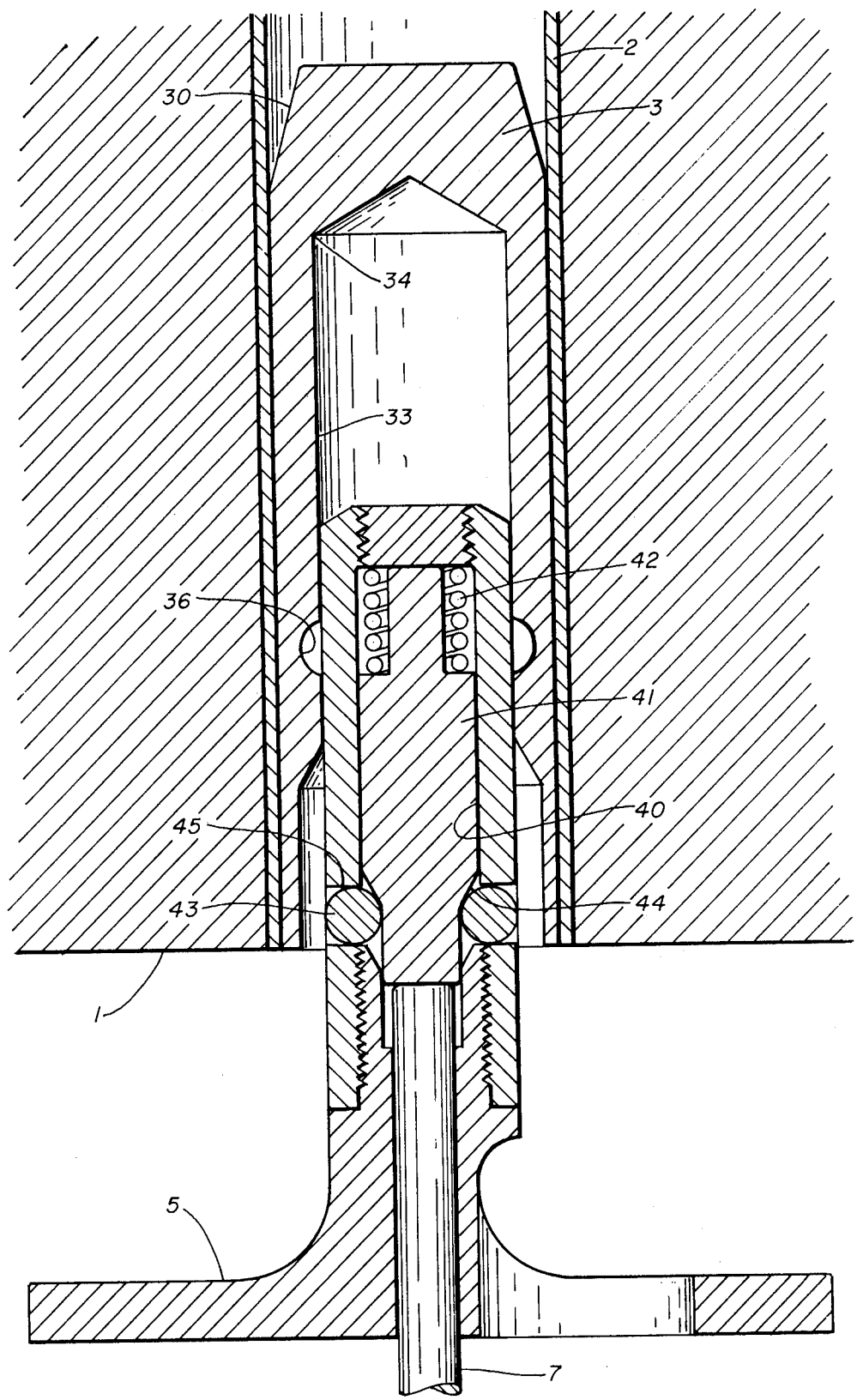
FIG. 4 is a sectioned elevation of the mandrel being thrust up into position within the bore of the plug of FIGS. 2 and 3; and, FIG. 5 is the mandrel of FIG. 4 locked into position within the plug.

The overall operation is apparent in that the gun 4 is placed in the position shown in FIG. 1 manually. The motor 13 is energized to rotate barrel 16 through gears 15, with its electrode, while coolant is circulated to withdraw the heat generated. When the welding at position shown is completed, latch 8 is actuated to move plunger push rod 7 to disengage the mandrel from the internal wall of the tube plug. The gun is then dropped down and transferred to another tube plug where welding is required, and the operation repeated. For more detailed disclosure of the tube plug and its force fit into a tube 2, FIGS. 2 and 3 are provided. FIGS. 4 and 5 are provided to disclose, with unmistakable clarity, the mandrel's all-important link with the tube plug.

TUBE PLUG 3

FIGS. 2 and 3 are to be taken together for thorough understanding of the different parts of the plug in their cooperation with tubes 2 and the mandrel 5 under the concepts of the invention. FIG. 2 discloses the plug 3 partially thrust up into tube 2. FIG. 3 shows the plug 3 in its final position within the tube 2.

The external configuration of plug 3 is that of a bullet. The external wall of the plug is bevelled at 30, so there will be absolutely no hangup in getting the plug initially started into tube 2. From bevel 30, along the outside surface of the plug 3, down to about position 31, the diameter of the plug is uniform and approximately 0.005" smaller than the internal diameter of tube 2. Welding electrode 17 is mounted on the barrel and offset from the axis the distance which will enable it to properly engage the surface to be welded a radial distance from the axis.

Initially, the plug is inserted by hand, as shown in FIG. 2. From position 31 to the lower edge of position 32, the external sides of the plug 3 are given a slight flare. In an actual reduction to practice, the diameter at position 31 was 0.005", flaring outwardly to a diameter at position 32 of 0.675".

The cylindrical surface from bevel 30 to position 31 provides an extensive guiding portion for the plug for accurate manual insertion up into designated tube 2. To get the plug the rest of the way into position, a hammer can then strike the plug upward from its lower edge and readily swage the plug from position 31 to edge 32. The result is a force fit of the plug which will resist dislodgment by hundreds of pounds of force. The design contemplates at least 500 pounds of force being required to remove the plug.

The internal bore 33 is sized to receive the outside diameter of the mandrel 5 of FIG. 1. Bore 33 is formed cylindrically from position 34 to position 35 to accommodate the upper portion of mandrel 5. A groove 36 is formed in this wall, shaped to accommodate spherical bodies mounted on mandrel 5. Groove 36 functions as a race for these spherical bodies. The cooperation between the race structure and the spherical bodies will be more clearly seen in connection with FIGS. 4 and 5.

FIG. 3 shows the plug 3 hammered up into position so the lower edges at position 32 are flush with the lower edges of tube 2 and tube sheet 1 surface. The force fit lodges the tube plug into position with such stability that the welding gun 4 can be suspended therefrom with the assurance that the plug will not be dislodged from its FIG. 3 position.

THE MARRIAGE OF THE PLUG AND MANDREL

FIGS. 4 and 5 show plug 3 in its FIG. 3 position, force fit into tube 2. FIGS. 4 and 5 are to be taken together in showing the two-step rape of plug 3 by the mandrel 5. FIG. 4 shows the male mandrel 5 partially inserted into female bore 33, its linking spherical elements retracted so as not to impede or obstruct the full engagement of mandrel 5 up to bore 33 of plug 3. FIG. 5, of course, shows the mandrel 5 in fully inserted position and the spherical elements forced radially outward into engagement with groove-race 36.

The external profile of mandrel 5 is that of a cylinder. This protuberance could be fabricated into various parts and threaded together as indicated. The precise parting lines, number of parts and modes of assembly are a matter of fabrication design which do not form a significant aspect of the invention. The essential elements are that the mandrel 5 includes a central cavity 40, in which plunger 41 reciprocates. Plunger 41 is moved upwardly by direct engagement with push rod 7, and is urged downwardly by the force of spring 42 between the top of the cavity 40 and the top of the plunger 41. In reciprocation, the plunger 41 actuates spherical bodies, or balls 43, into and out of groove-race 36.

In FIG. 4, plunger 41 is shown in its upward position carrying its downwardly facing ram 44 out of contact with balls 43. Without contact with ramp 44, the balls are moved toward the axis of the mandrel 5, and out of groove-race 36. The result is that the cylindrical profile of mandrel 5 slides smoothly, upwardly, into position with bore 33. However, FIG. 5 discloses the actuation of this mechanism to link tube 3 and mandrel 5, so that mandrel 5 will be positively held in its upward position, within the bore 33, and yet be given the freedom to rotate with balls 43 as a bearing between the two structures.

FIG. 5 discloses how balls 43 have been contacted by ramp 44, as plunger 41 is moved downwardly. Contacted by the surface of the ramp, the balls are forced radially outward through holes 45, the sizing and arrangement is such that the balls are not moved entirely out of their holes, but enough of the balls are moved into the groove-race 36 to give the desired linkage between the mandrel and the plug. The balls are held in this position by contact with the ramp 44 and thus lodged between plunger 41 and groove-race 36. So wedged, the balls become a protuberance structure from the side of the mandrel 5, which does not permit withdrawal of the mandrel from the bore 33, yet mandrel 5 is free to rotate with the balls as rolling contacts between the mandrel and top groove.

It is now evident that the end result of the arrangement is that the balls are manually actuated by the push rod and plunger to act as protuberances moved outwardly from the mandrel to fully engage the tube plug and thereby suspend the mandrel and welding equipment attached to, and part of, the mandrel from the underside of the tube sheet. Thus suspended, the welding apparatus attached to the mandrel is held in position to rotate and perform its welding function on the very tube plug from which it is suspended.

CONCLUSION

The invention finds embodiment in the novel form of tube plug 3, the mandrel 5 linkage with the tube plug and the cooperative arrangement of welding gun 4. Ultimately, the electrode of the gun is brought into effective contact with the lower edge of the plug, the ends of the tube into which the plug is positioned and the tube sheet to form them into a unitary weld, which seals the tube. The unique combination enables relatively unskilled personnel to position the novel tube plug into its force fit with the tube, so it may be efficiently welded.

Further, relatively unskilled personnel may guide the mandrel up into the tube plug and linkage readily actuated by push-button to suspend the welding gun from the tube plug. Finally, the welding operation is reduced to the level of a push button, actuate the welding gun and the subsequent automatic operation of the gun to complete the weld. Removal of the gun and transfer to a second tube plug is relatively child's play, given the invention as embodied. Thus, the technology of plugging tubes is advanced into the realm of semi-automatic operation which reduces man-rem hours, and elevates the quality of the welding work product.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A system for removing designated tubes of a steam generator from service in the steam generator, including,
    a heat exchanger having a tube sheet facing downwardly and its tubes extending their ends downwardly through the tube sheet with the bore of each tube opened to the lower side of the tube sheet the system comprising,
    a plug having the general external form of a bullet and shaped and sized for being forced upwardly into a designated tube of the heat exchanger which is to be removed from service,
    a bore with an internal wall formed upwardly into the plug to give the plug a completed shell form with a circumferential groove formed in the internal wall,
    a mandrel of elongated form thrust upwardly into the bore of the plug,
    a structure mounted on the mandrel which is actuatable radially outward from the axis of the mandrel to engage the circumferential groove in the internal wall of the bore and thereby retained within the bore in opposition to gravity forces acting upon welding equipment connected to the lower end of the mandrel, and
    a welding gun adapted to weld the lower ends of the tube and plug and supported by the lower end of the mandrel and rotatable thereon to effectively weld the lower edge of the plug to the lower edge of the tube in which the plug is inserted.

2. The system of claim 1, wherein,
    a groove is formed circumferentially in the sides of the tube plug bore, and
    the outwardly actuatable structure on the mandrel includes a plurality of spherical bodies engaging the groove as a retaining link between the tube plug and the mandrel in which the mandrel is rotatable to enable the welding gun attached to the mandrel to form the circular weld between the lower edges of the plug and the tube and the tube sheet.

3. The system of claim 2, wherein,
    structure is provided to be manually accessible on the welding gun to actuate and deactuate the engagable structure on the mandrel, and motive structure is mounted on the welding gun to be manually actuated in rotating the welding electrode in the gun in positive rotation of the welding electrode in forming the weld.

4. A system for sealing the end of a tube which is thereby removed from service in a heat exchanger, including,
    a heat exchanger vessel,
    a tube sheet extended across the vessel and oriented horizontally,
    tubes arranged in the vessel so as to extend their ends downwardly through the tube sheet and open to receive a plug body the system comprising,
    a plug body which is adapted and arranged and sized to be positioned up into the open end of that tube designated for removal from service,
    an external profile for the plug body in the general shape of a bullet having a first contour of cylindrical configuration provided for the upper half of the plug and a second contour of flared form for substantially the lower half of the plug,
    a bore provided axially and from the lower end of the plug to terminate short of the upper end of the plug,
    a groove provided circumferentially at substantially the mid-point of the upwardly extended bore,
    whereby the cylindrical upper half of the plug positively guides the insertion of the plug toward its final position in the tube and flared lower half is swaged by force applied to the lower end of the plug as the plug is driven to its final position at which the force fit generates between the plug and tube wall a resistance to removal in the order of five hundred pounds,
    a cylindrical mandrel body sized for insertion up into the plug bore and provided with radial protuberances which are manually actuated to engage the circumferential groove of the plug bore in retention of the mandrel and structure connected to the mandrel below the plug, and
    welding apparatus connected to the lower end of the mandrel with its electrode rotatable about the axis of the plug bore and mandrel to weld the lower end of the plug and tube and tube sheet.

5. The system of claim 4, in which the protuberances of the mandrel and spherical bodies forced radially outward from the mandrel and into the circumferential groove to function as a linking structure between the plug and mandrel, while providing rotational movement of the mandrel about its axis.

6. The system of claim 5, including,
    a motor connected to the support for the welding electrode which is actuated to automatically rotate the electrode in its circular path about the mandrel axis to complete its weld of the plug into its final position.

7. The system of claim 6, wherein,
    a cup-shaped structure is mounted on the support for the welding electrode and engages the tube sheet about the welding electrode with the lip of the cup-like structure to form a link between the support for the welding electrode and the tube sheet and to isolate the welding operation at the welding electrode.

* * * * *